(12) United States Patent
Harada et al.

(10) Patent No.: US 6,476,820 B1
(45) Date of Patent: Nov. 5, 2002

(54) VIDEO IMAGE DISPLAY APPARATUS AND METHOD

(75) Inventors: Shigeru Harada; Junji Kagita, both of Tokyo (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 09/046,501

(22) Filed: Mar. 23, 1998

(30) Foreign Application Priority Data

Mar. 31, 1997 (JP) ............................................. 9-081297

(51) Int. Cl.[7] ............................ G09G 5/02; G09G 5/00; H04N 5/14; H04N 9/64
(52) U.S. Cl. ..................... 345/589; 345/581; 348/577; 348/652; 348/649
(58) Field of Search ........................ 348/652, 52, 592, 348/577, 649; 345/150, 153, 154, 581, 589

(56) References Cited

U.S. PATENT DOCUMENTS

| | | | | |
|---|---|---|---|---|
| 4,667,228 A | * | 5/1987 | Kawamura et al. | 348/675 |
| 4,839,718 A | * | 6/1989 | Hemsky et al. | 348/577 |
| 4,953,008 A | * | 8/1990 | Kaye | 348/577 |
| 5,119,074 A | * | 6/1992 | Greaves et al. | 345/154 |
| 5,585,860 A | * | 12/1996 | Takeshima | 348/652 |
| 5,734,416 A | * | 3/1998 | Ito et al. | 348/52 |
| 5,754,165 A | * | 5/1998 | Oyashiki et al. | 345/154 |
| 5,808,630 A | * | 9/1998 | Pannell | 345/154 |
| 5,825,539 A | * | 10/1998 | Hoshi | 345/9 |

* cited by examiner

*Primary Examiner*—Jeffery Brier
*Assistant Examiner*—Anthony Blackman
(74) *Attorney, Agent, or Firm*—Frommer Lawrence & Haug LLP; William S. Frommer; Gordon Kessler

(57) ABSTRACT

A signal Y outputted from a Y/C separating circuit is supplied to first and second matrices. Signals R-Y and B-Y are supplied to the first matrix through a gain control amplifier (GCA) and are also supplied to the second matrix. The signals Y, R-Y, and B-Y are converted into three primary color signals R, G, and B by the second matrix. From the signals R, G, and B, a skin color component is detected by a skin color detecting circuit and $E_{skin}$ is outputted. On the basis of $E_{skin}$, color components other than the skin color are detected by a color component detecting circuit and $E_{other}$ is outputted. $E_{other} - E_{skin}$ is supplied as a control voltage to the GCA. Gains for the signals R-Y and B-Y are controlled. When the video signal indicates the skin color component, the control voltage is set to 0 and the gain is set to 1. When the video signal indicates a color component other than the skin color component, $E_{other}$ is generated, the control voltage rises, and the gain is increased. The colors other than the skin color are emphasized and the color contrast is more naturally enhanced.

16 Claims, 11 Drawing Sheets

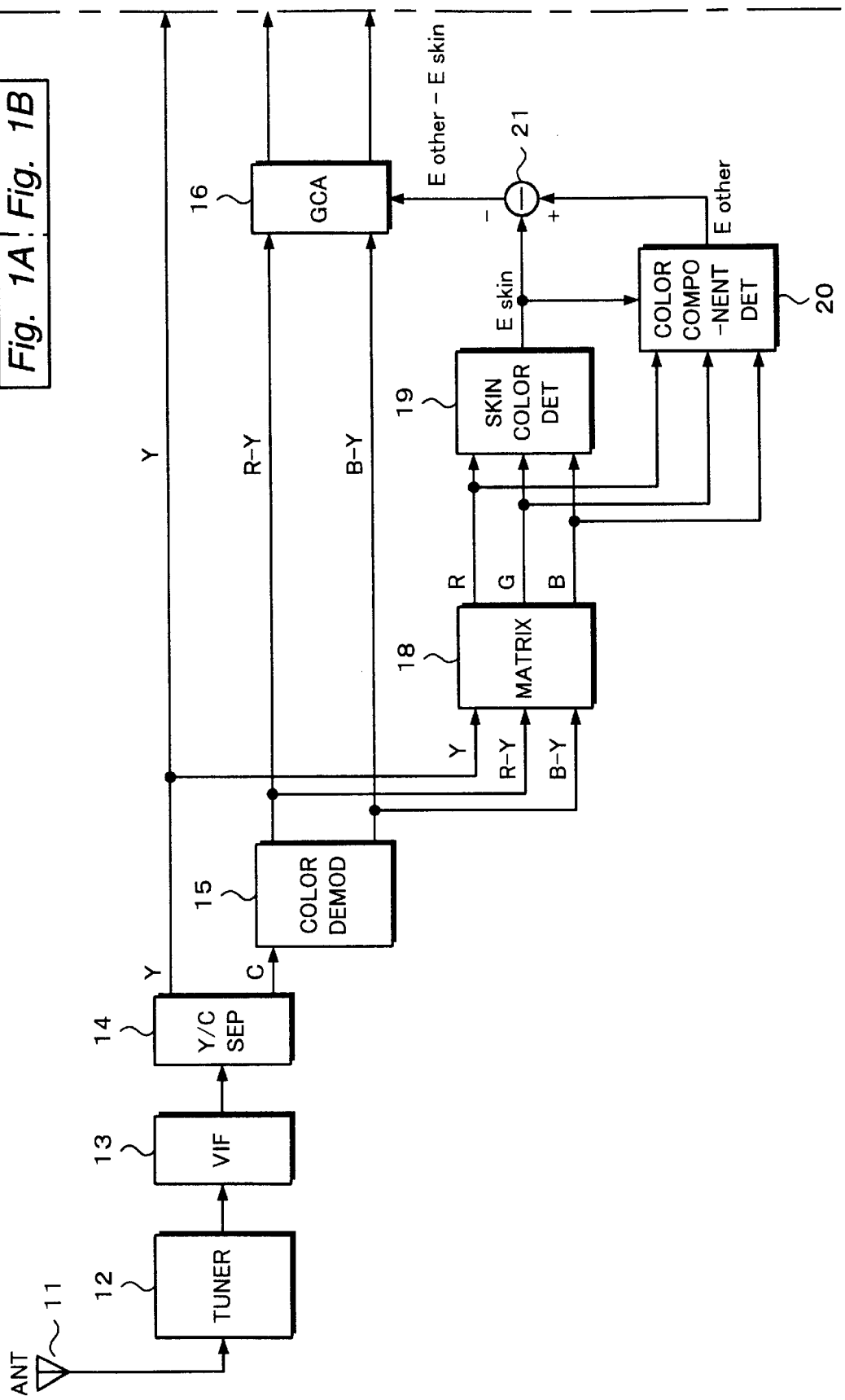

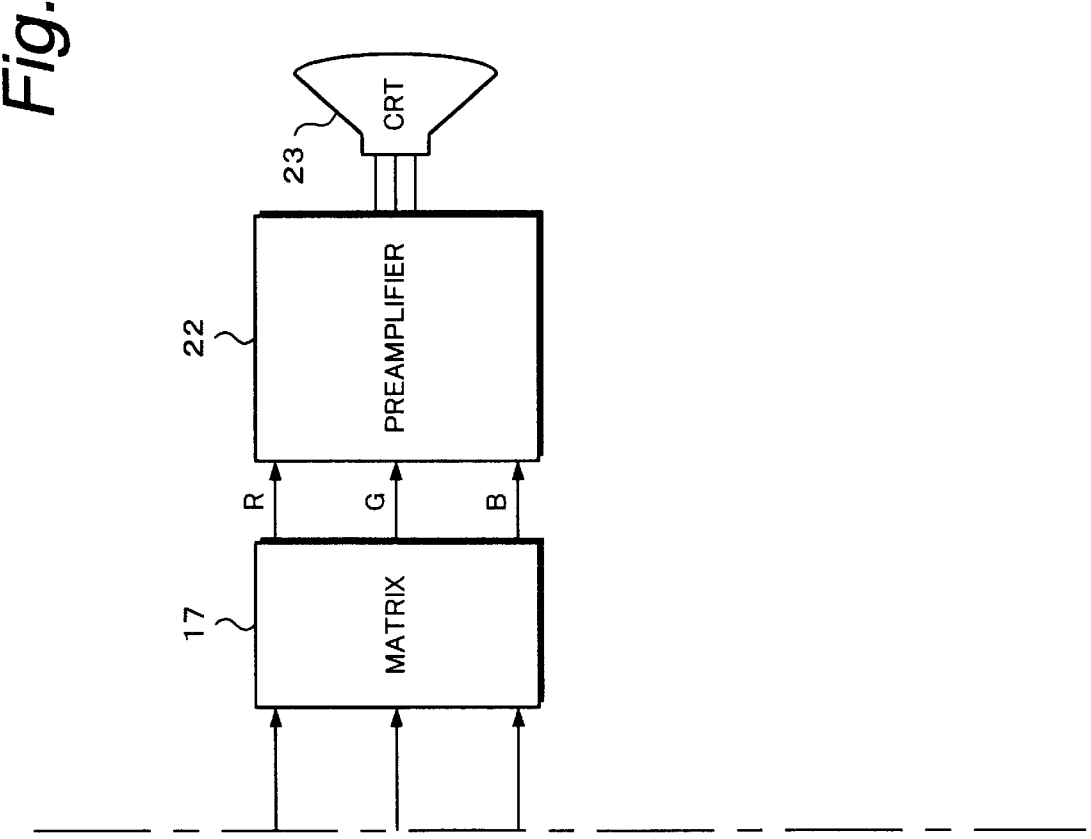

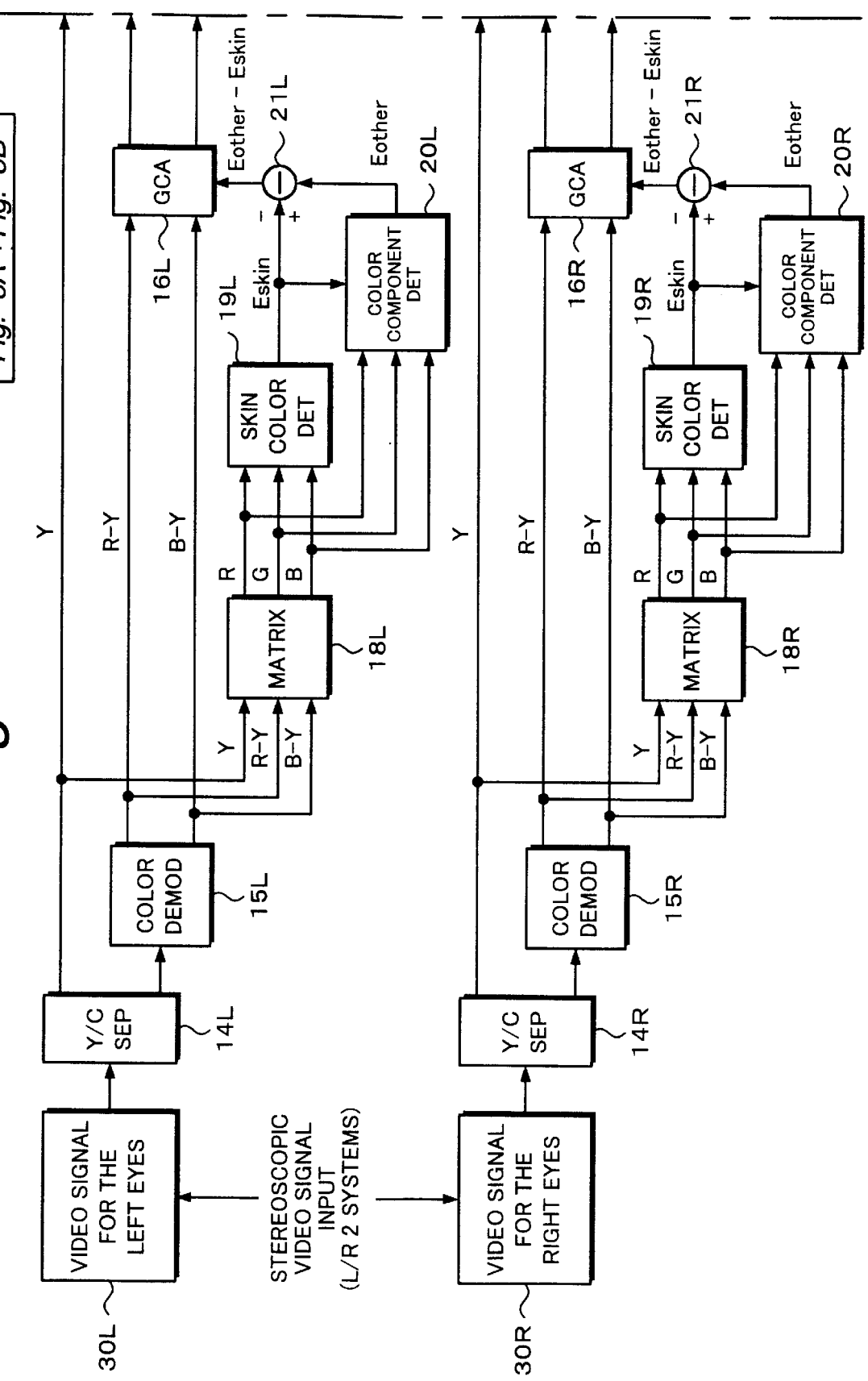

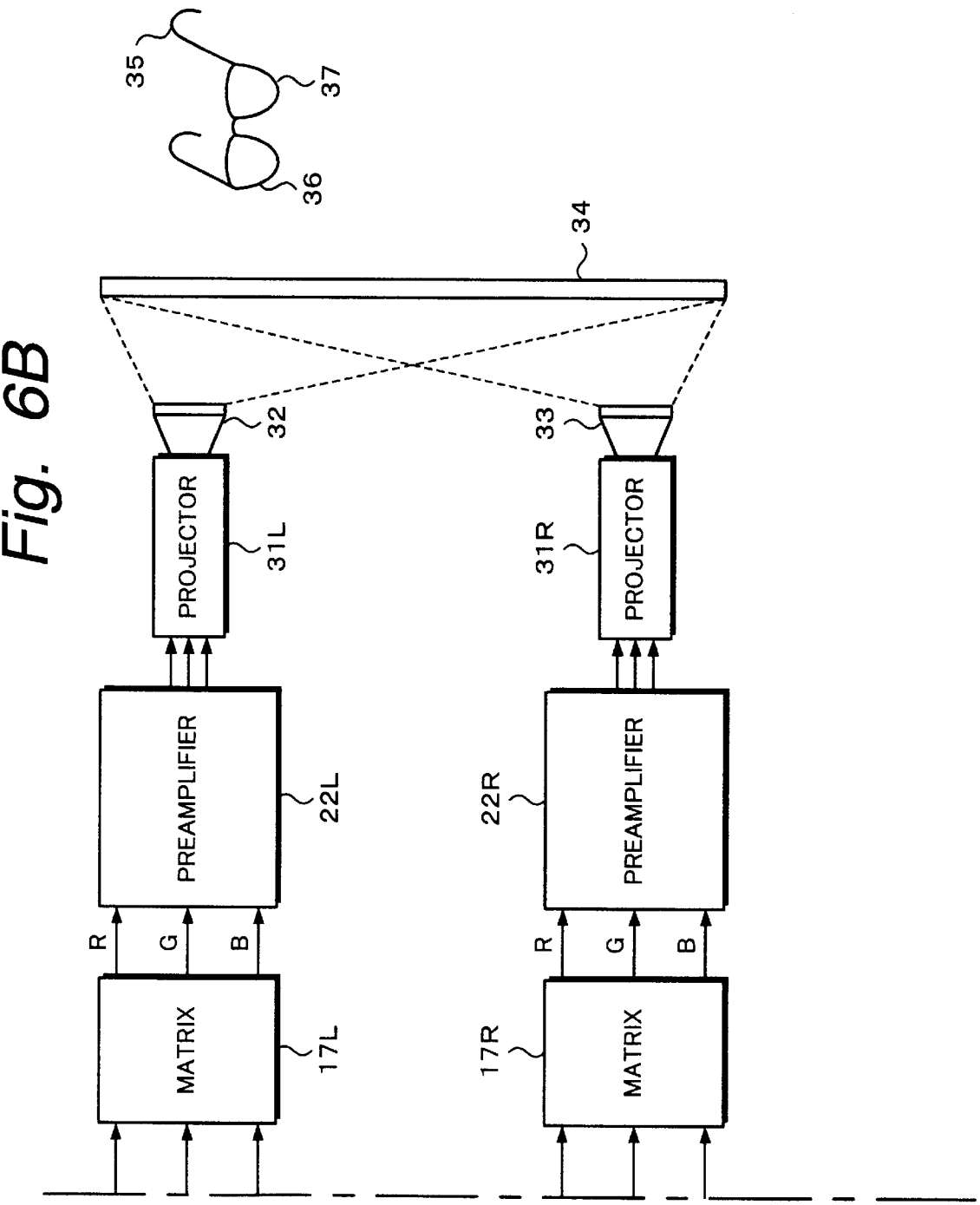

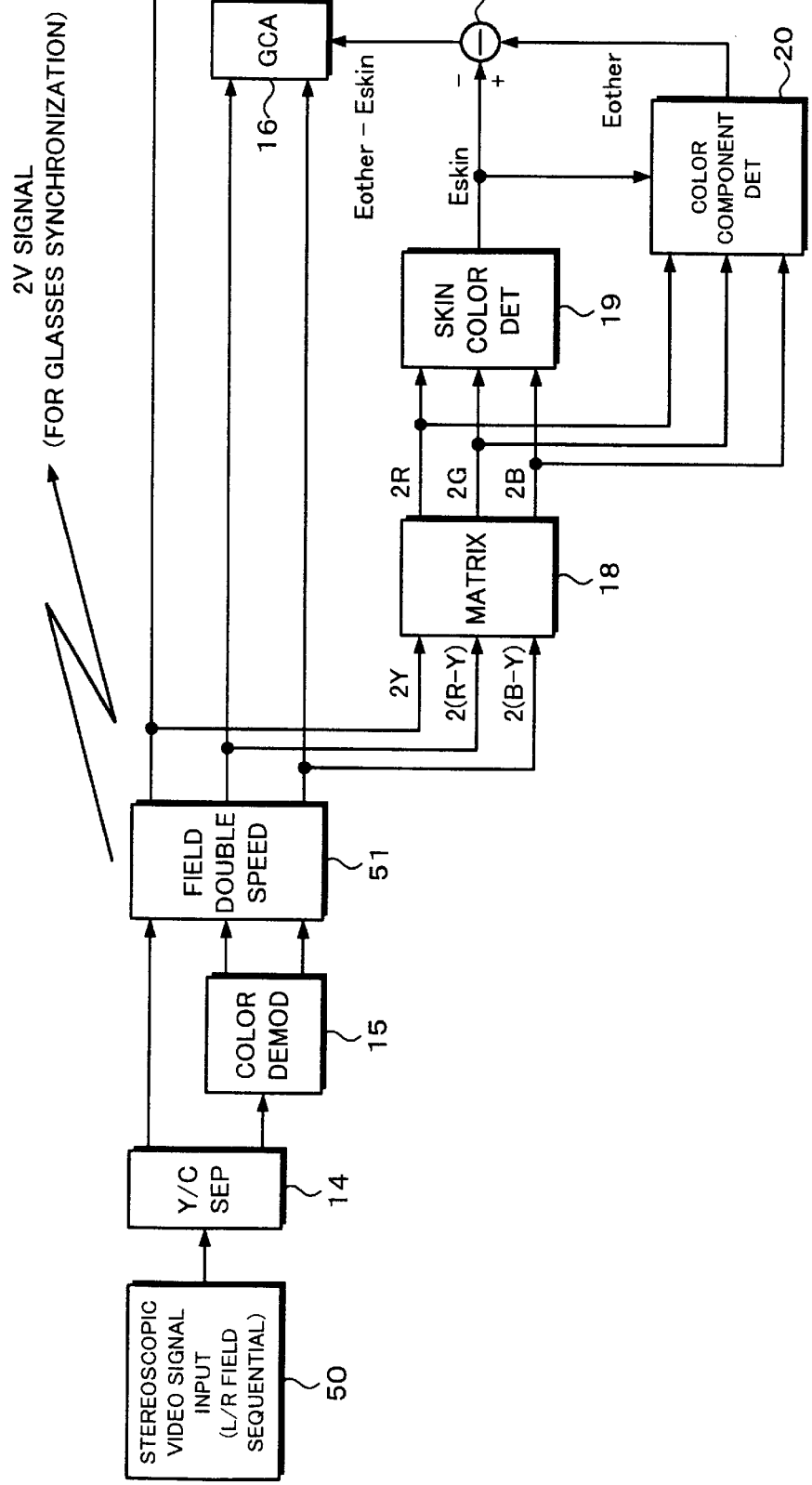

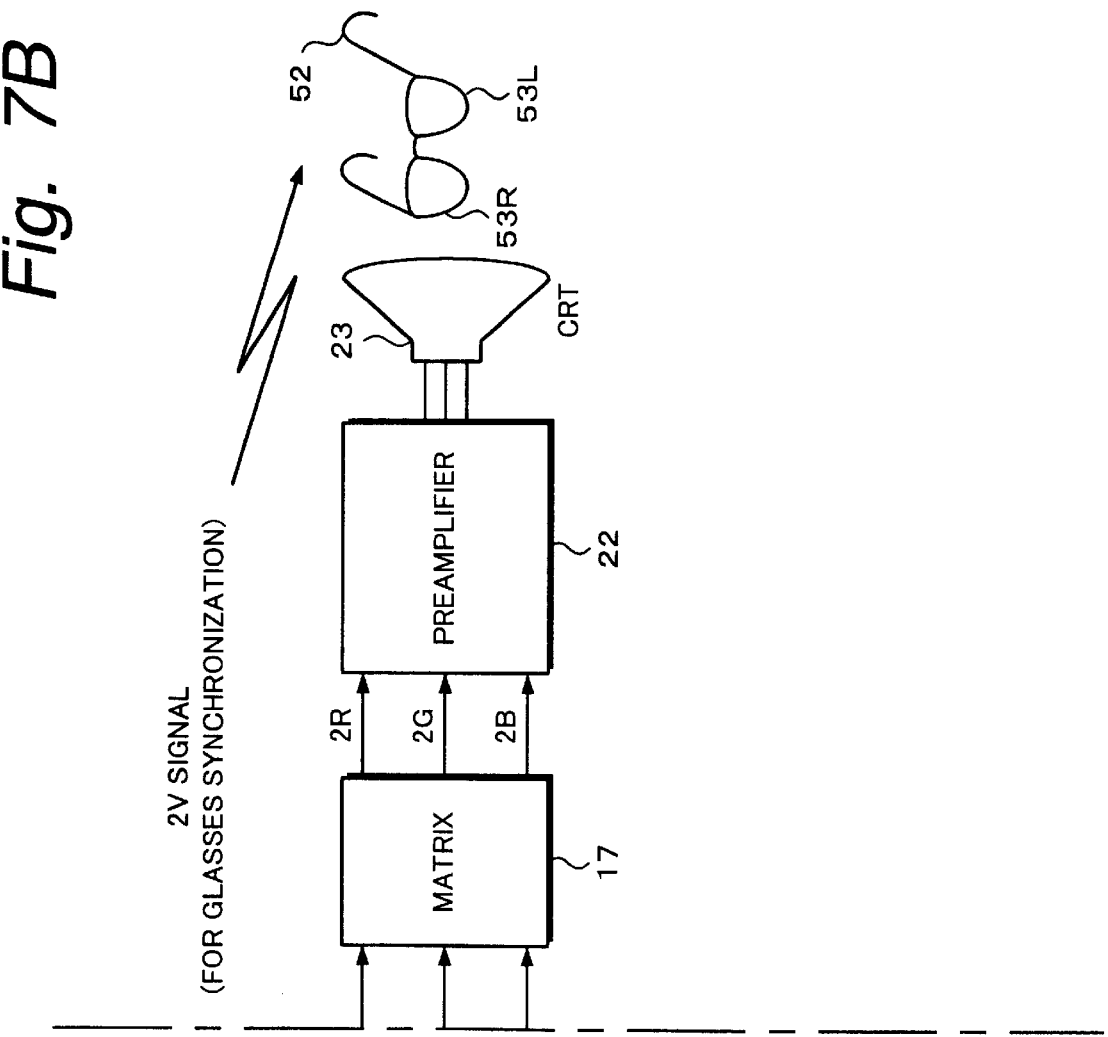

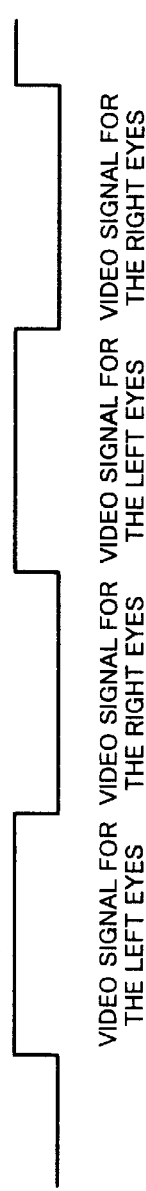

VIDEO IMAGE DISPLAY APPARATUS AND METHOD

BACKGROUND OF THE INVENTION

1. Field of the Invention

The invention relates to video image display apparatus and method for displaying a video signal and, more particularly, to video image display apparatus and method for improving a contrast ratio of an image by more naturally performing a color emphasis.

2. Description of the Related Art

In a video image display apparatus, for example, a video monitor for displaying a video signal onto a display, by performing a Y/C separating process to an inputted composite video signal, a component video signal comprising a luminance signal Y and color difference signals R-Y and B-Y is obtained. By matrix processing the component video signal, signals of R (red), G (green), and B (blue) are obtained. By performing predetermined signal processes to the R, G, and B signals obtained, a video image is displayed to a display device such as CRT, LCD (liquid crystal display), or the like.

In such a display apparatus, to obtain a more clear video image, for instance, there is a method of improving a contrast of the video image by emphasizing a color by raising a gain of each of the R, G, and B signals.

Among colors, colors having a mentally special meaning exist. As a typical example of such a color, a skin color can be mentioned. The skin color is called a memory color and is a color which the human being inherently has and which has been strongly memorized. Therefore, for example, when a balance among the RGB colors constructing the skin color is merely delicately deviated, a viewer who sees the skin color feels a sense of physical disorder.

Thus, if the contrast is improved by emphasizing the color by raising the gain of each of the R, G, and B signals as mentioned above, a color gain of the skin color as a memory color also rises and there is a problem such that the skin color becomes an unnatural color.

Consequently, hitherto, the color gain is not raised to a value which is equal to or higher than an ordinary set value and there is a problem such that a large improvement of the contrast by the color emphasis cannot be expected.

OBJECTS AND SUMMARY OF THE INVENTION

It is, therefore, an object of the invention to provide video image display apparatus and method in which a sense of physical disorder is not given to a viewer when a contrast is improved by a color emphasis.

According to the invention, to solve the above problems, there is provided a video image display apparatus for receiving a video signal and displaying a video image onto a display device, comprising: first detecting means for detecting a skin color component of the video signal; second detecting means for detecting color components other than the skin color component of the video signal; and color component control means for controlling a gain of the color components of the video signal on the basis of a detection result of the first detecting means and a detection result of the second detecting means.

According to the invention, to solve the above problems, there is also provided a video image display method of receiving a video signal and displaying a video image onto a display device, comprising: first detecting step of detecting a skin color component of the video signal; second detecting step of detecting color components other than the skin color component of the video signal; and color component control step of controlling gains of for the color components of the video signal on the basis of a detection result in the first detecting step and a detection result in the second detecting step.

As mentioned above, according to the invention, the skin color component and the other color components of the video signal are detected and the gains of the color components of the video signal are controlled on the basis of the detected result. Therefore, the gain for the color component of the video signal in the region of the skin color and the gains in the region of the other colors can be made different.

The above and other objects and features of the present invention will become apparent from the following detailed description and the appended claims with reference to the accompanying drawings.

BRIEF DESCRIPTION OF THE DRAWINGS

FIGS. 1A and 1B are block diagrams showing an example of a construction of a television receiver to which the invention is applied;

FIGS. 6A and 6B are block diagrams showing an example of a construction of an apparatus according to the second embodiment and shows an example in which the invention is applied to a device for individually supplying a video signal for the left eye and a video signal for the right eye, thereby performing a stereoscopic display;

FIGS. 7A and 7B are block diagrams showing an example of a construction of an apparatus according to the third embodiment and shows an example in which the invention is applied to a device for sequentially supplying a video signal for the left eye and a video signal for the right eye, thereby performing a stereoscopic display; and FIGS. 8A, 8B and 8C are schematic diagrams for explaining a process by a field double speed circuit.

DETAILED DESCRIPTION OF THE PREFERRED EMBODIMENTS

Figure 2:
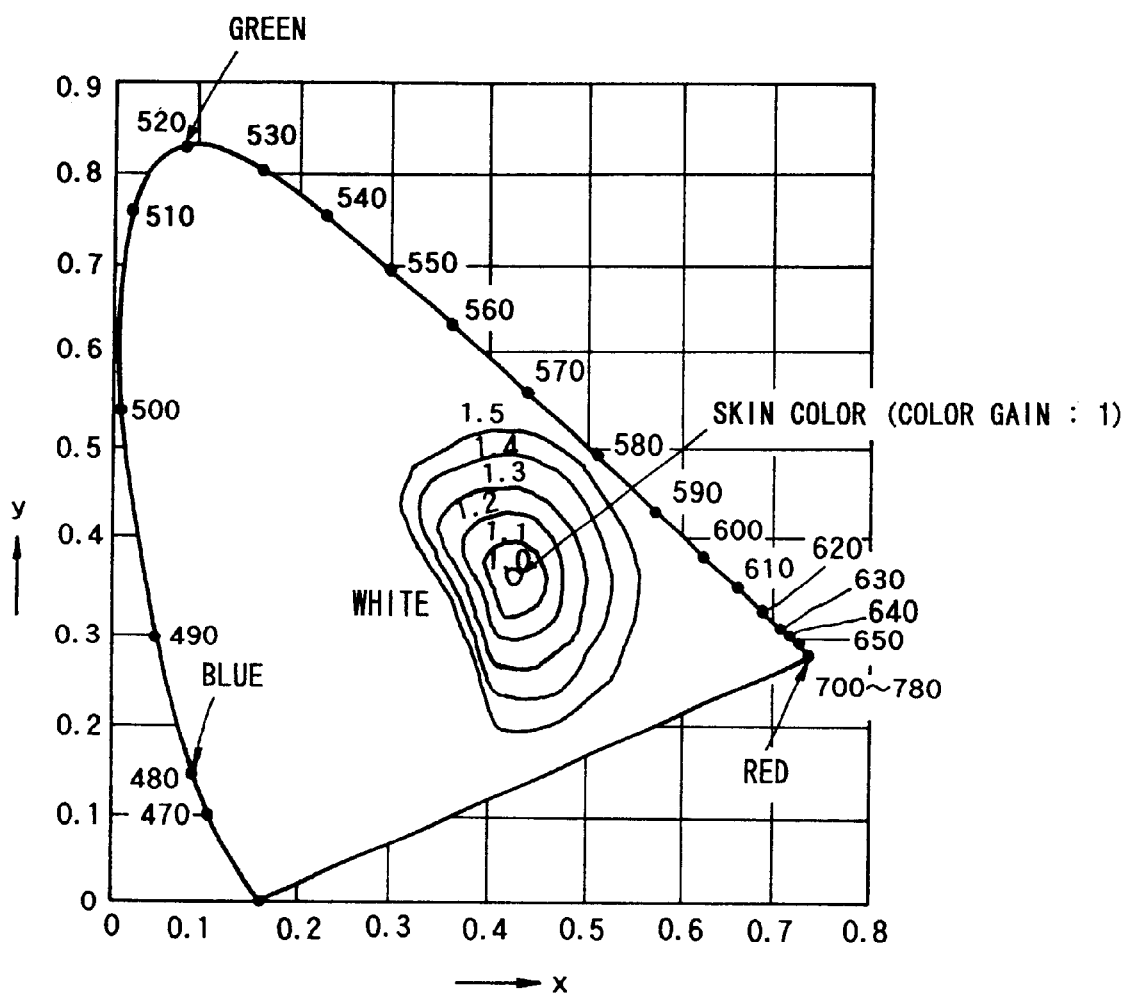
FIG. 2 is a diagram in which an example of a region where a gain of GCA is increased is shown on an x-y chromaticity diagram.

The first embodiment of the invention will now be described hereinbelow with reference to the drawings. According to the invention, a specific color component in a video signal, for example, a skin color component is detected and gains of the other colors are controlled on the basis of the detected color component, thereby enabling a more clear video image to be obtained. FIGS. 1A and 1B show an example of a construction of a television receiver to which the invention is applied. A television signal of a desired channel is received by an antenna 11 and a tuner 12. A television broadcasting signal is an example of video signal sources and a video signal can be also received from an analog satellite broadcasting, a digital broadcasting, or a video signal reproducing apparatus using a medium such as disk, tape, or the like.

An output of the tuner 12 is converted into a composite television signal by a VIF circuit 13. An output of the VIF circuit 13 is supplied to a Y/C separating circuit 14 and a luminance signal Y and a chrominance signal (carrier chrominance signal) C are separated. The luminance signal Y is supplied to a matrix circuit 17. The chrominance signal C is supplied to a color demodulating circuit 15 and is color demodulated. Two color difference signals R-Y and B-Y from the color demodulating circuit 15 are supplied to the matrix circuit 17 through a gain control amplifier (GCA) 16. A gain of the GCA 16 is controlled on the basis of a predetermined control voltage, thereby changing levels of the supplied color difference signals R-Y and B-Y.

Three primary color signals R, G, and B are formed by the matrix circuit 17. Such signal processes are similar to those in the well-known television receiver. Audio signal processes are omitted for simplicity of explanation. The three primary color signals R, G, and B formed by the matrix circuit 17 are supplied to a preamplifier 22. The three primary color signals R, G, and B are subjected to a predetermined process such as a gamma ($\gamma$) correction by the preamplifier 22 and supplied to a CRT driving circuit (not shown). A CRT 23 is driven and a video image is displayed by the CRT 23.

The luminance signal Y and color difference signals R-Y and B-Y are also supplied to a matrix circuit 18. The matrix circuit 18 has a function similar to that of the foregoing matrix circuit 17 and forms three primary color signals R, G, and B from the supplied signals Y, R-Y, and B-Y.

The three primary color signals R, G, and B outputted from the matrix circuit 18 are supplied to a skin color detecting circuit 19 and are also supplied to a color component detecting circuit 20. The skin color detecting circuit 19 detects whether the supplied three primary color signals R, G, and B relate to the skin color component or not by a predetermined method.

Although the details will be explained hereinlater, when the three primary color signals R, G, and B are set to a predetermined ratio, the color expressed by the signals R, G, and B is determined as a skin color and the signals R, G, and B show the skin color component. The detected skin color component is converted into, for example, a voltage and is outputted as a voltage $E_{skin}$. That is, the discrimination about the skin color component depends on the ratio of the signals R, G, and B and is not influenced by the absolute values. Therefore, in case of a darker skin color, the value of the voltage $E_{skin}$ also decreases. The voltage $E_{skin}$ is supplied to one input terminal of a subtractor 21 and is also supplied to the color component detecting circuit 20.

The color component detecting circuit 20 detects color components other than the skin color component on the basis of the three primary color signals R, G, and B and voltage $E_{skin}$. The detected other color component is converted into, for example, a voltage and is outputted as a voltage $E_{other}$. When the region to perform the detection corresponds to the skin color component, the voltage $E_{other}$ is set to 0. In case of the color component different from the skin color component, the voltage $E_{other}$ is generated on the basis of a degree of the different color component. The voltage $E_{other}$ is supplied to another input terminal of the subtractor 21.

The subtractor 21 subtracts the voltage $E_{skin}$ from the voltage $E_{other}$. A subtraction result is supplied as a control voltage to the GCA 16. When the color of the region where the detection was performed is the skin color component, the voltage $E_{other}$ is set to 0 and the subtraction result is set to a voltage ($-E_{skin}$). On the other hand, when the detected region corresponds to a color component other than the skin color, the voltage $E_{other}$ is generated and the subtraction result by the subtractor 21 shows a value higher than that in case of only the voltage $E_{skin}$. The gain of the GCA 16 is changed in accordance with the voltage obtained by the subtraction result. That is, when the subtraction result indicates the voltage $E_{skin}$, the gain is set to 1. When the subtraction result indicates a voltage which is equal to or larger than the voltage $E_{skin}$, the gain is increased in association with the voltage value.

FIG. 2 shows an example of a region where the gain of the GCA 16 is increased on the x-y chromaticity diagram. In the region shown as a skin color in the diagram, the gain is set to 1. The gain is increased as the detected color component is away from the skin color region on the chromaticity diagram. In this case, the gain is increased from 1 to 1.5. A degree of the increase of the gain is made different in dependence on the direction when departing from the skin color region on the chromaticity diagram.

With the above construction, the color gain is set to 1 in the region where the color is detected to be the skin color in the image, while in the region other than the skin color region, the color gain is raised on the basis of the voltage value of the voltage $E_{other}$. Therefore, the color gain can be raised in the region other than the region where the color is detected to be the skin color in the image, thereby enabling the color contrast to be enhanced in the region other than the skin color region.

A method of forming the voltages $E_{skin}$ and $E_{other}$ will now be described with reference to FIGS. 3 to 4C. An arbitrary color is determined by amounts of R (red), G (green), and B (blue) constructing three primary colors. Therefore, for example, in the video signal comprising the signals of three primary colors, the color is determined by the values of the voltages $E_R$, $E_G$, and $E_B$ corresponding to R, G, and B, respectively.

It is known that when there is a certain specific relation among the colors of R, G, and B, the color is the skin color. For example, when a ratio of the colors of R, G, and B is equal to (1.64:1.51:1), the color is determined to be the skin color. In another example, when the ratio (R:G:B) is equal to (1.43:1:1), the color is decided to be the skin color. The color when (R:G:B)=(1.64:1.51:1) is defined as a skin color. That is, in the video signal, the color which is displayed when the ratio of the voltages $E_R$, $E_G$, and $E_B$ is equal to (1.64:1.51:1) is felt as a skin color.

As another viewpoint, it is now considered that an arbitrary color is constructed from the skin color component and the other color components. In this case, now assuming that the skin color component is labeled as $C_{skin}$ and the other color components are labeled as $C_{other1}$, and $C_{other2}$ the conversion from the arbitrary colors R, G, and B into the colors $C_{skin}$, $C_{other1}$, and $C_{other2}$ based on the skin color component is accomplished. In case of applying it to the video signal, now assuming that the voltage of the skin color component is labeled as $E_{skin}$ and the voltages of the other color components are labeled as $E_{other1}$ and $E_{other2}$, this means that the voltages $E_R$, $E_G$, and $E_B$ corresponding to the arbitrary colors can be converted into the voltages $E_{skin}$, $E_{other1}$, and $E_{other2}$ based on the skin color component.

The skin color component is obtained by the skin color detecting circuit 19. The skin color detecting circuit 19 is constructed by, for example, an analog arithmetic operating unit and detects the skin color component by, for instance, the following method. The voltages $E_R$, $E_G$, and $E_B$ of the colors in case of the skin color assume $K_R$, $K_G$, and $K_B$, respectively. As mentioned above, since the ratio of (R:G:B) of the skin color component is set to (1.64:1.51:1), the relation of $K_R > K_G > K_B$ is obtained. Therefore, the voltages are normalized as follows by $K_B$ in which the amplitude is the minimum.

$$K_R : K_G : K_B = K_R' : K_G' : 1$$

When the voltages $E_R'$, $E_G$, and $E_B$ are normalized to $E_R'$, $E_G'$, and $E_B'$ by $K_R'$ and $K_G'$, we have $E_R' = E_R / K_R'$ $E_G' = E_G / K_G'$ $E_B' = E_B$ Namely, in case of the skin color, $E_R' : E_G' : E_B' = 1:1:1$. FIG. 3 shows an example in which the voltages of the three primary color signals $E_R$, $E_G$, and $E_B$ of the skin color shown on the left side in the diagram are normalized to $E_R'$, $E_G'$, and $E_B'$ by $K_R'$ and $K_G'$.

As mentioned above, the arbitrary colors are normalized by the ratios $K_R'$, $K_G'$, and $K_B'(=1)$ of the colors of R, G, and B in the skin color and the minimum value among the values obtained is set to the skin color component. That is, as shown in FIG. 3, the voltage value $E_{skin}$ corresponding to the skin color component is obtained as $$E_{skin} = \min(E_R', E_G', E_B')$$

Figure 3:
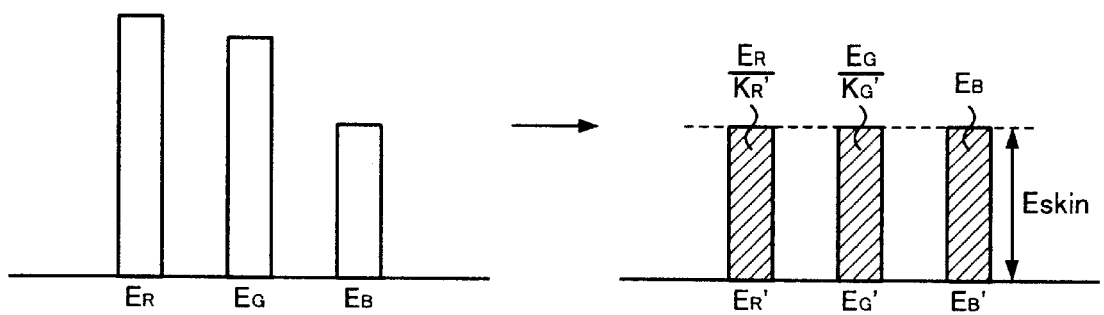
FIG. 3 is a schematic diagram for explaining a forming method of a voltage $E_{skin}$ and a voltage $E_{other}$.

When the target color is the skin color, as shown on the left side in FIG. 3, $E_{skin} = E_R' = E_G' = E_B'$.

The color components other than the skin color are obtained by the color component detecting circuit 20. The color component detecting circuit 20 is constructed by, for example, an analog arithmetic operating unit and the detection of the color components other than the skin color is performed by subtracting $E_{skin}$ from each of $E_R'$, $E_G'$, and $E_B'$ and adding subtraction results. That is, the voltage value $E_{other}$ corresponding to the other color component is obtained by $$E_{other} = E_R' + E_G' + E_B' - 3\min(E_R', E_G', E_B')$$

In the following description, "the voltage value $E_{skin}$ corresponding to the skin color component" is called a "skin color component $E_{skin}$" and "the voltage value $E_{other}$ corresponding to the other color component" is called "the other color component $E_{other}$".

Figure 4A:
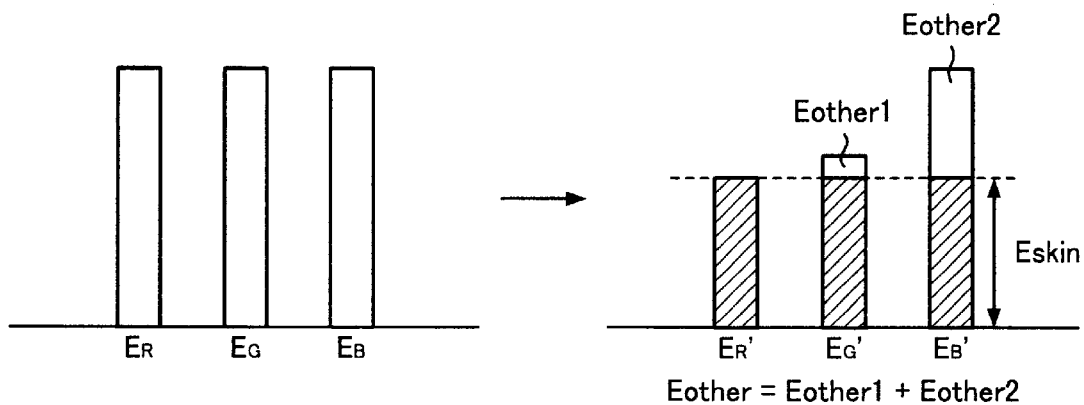
FIGS. 4A, 4B and 4C are schematic diagrams for explaining a forming method of a voltage $E_{skin}$ and a voltage $E_{other}$.
Figure 4B:
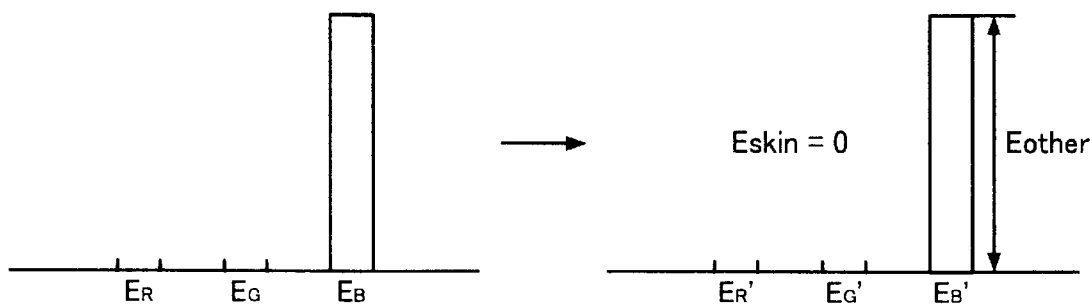
Figure 4C:
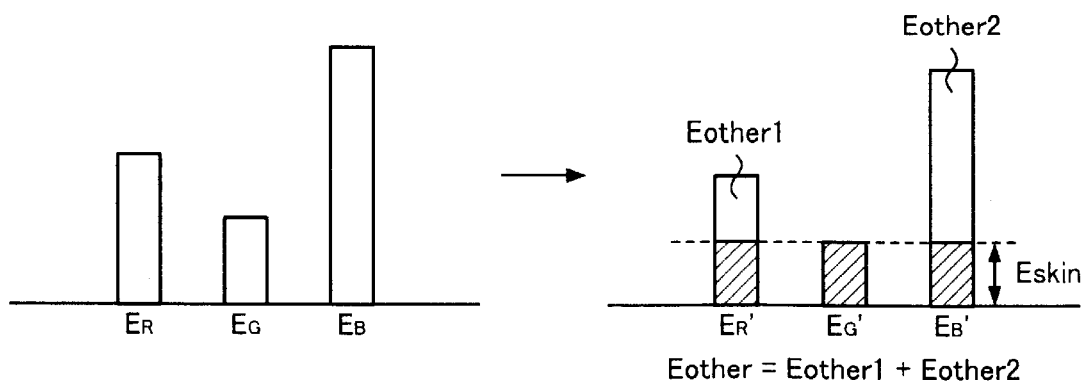

FIGS. 4A, 4B and 4C show an example of the skin color component $E_{skin}$ and the other color component $E_{other}$ in the actual color. FIG. 4A shows an example of a white color and $E_R$, $E_G$, and $E_B$ are mutually equal as shown on the left side in FIG. 4A. When the white color is normalized by $K_R'$, $K_G'$, and $K_R'$, $E_R'$, is the minimum as shown on the right side in FIG. 4A. At this time, the skin color component $E_{skin}$ and the other color component $E_{other}$ are obtained as follows.

First, the component which is set to the minimum value after the normalization is set to the skin color component $E_{skin}$. In the example of FIG. 4A, $E_R'$ is set to the skin color component $E_{skin}$. The skin color component $E_{skin}$ is subtracted from each of the other components $E_G'$ and $E_B'$ after the normalization, so that the other components $E_G'$ and $E_B'$ are converted into $E_{other1}$ and $E_{other2}$, respectively. That is, $$E_{other1} = E_G' - \min(E_R', E_G', E_B')$$

and $$E_{other2} = E_B' - \min(E_R', E_G', E_B')$$

On the basis of those expressions, the other color component $E_{other}$ is formed as follows.

$$E_{other} = E_{other1} + E_{other2}$$

Even in the examples shown in FIGS. 4B and 4C, the skin color component $E_{skin}$ and the other color component $E_{other}$ are obtained on the basis of a similar idea. In the example of a single blue color shown in FIG. 4B, the skin color component $E_{skin}$ is set to 0 and the other color component $E_{other}$ is set to a value of the color component of a single color. In an example of an arbitrary color as shown in FIG. 4C, as mentioned above, the minimum value ($E_G'$) after the normalization is set to the skin color component $E_{skin}$. Differences between the components (in this example, $E_R'$ and $E_B'$) showing values over $E_{skin}$ after completion of the normalization and $E_{skin}$ are labeled as $E_{other1}$ and $E_{other2}$, respectively.

Two outputs obtained by the skin color detecting circuit 19 and color component detecting circuit 20 as mentioned above, namely, the skin color component $E_{skin}$ and the other color component $E_{other}$ are supplied to one and another input terminals of the subtractor 21 and a subtraction is performed. That is, in the subtractor 21, a subtraction output of $E_{other} - E_{skin}$ is formed. By using the subtraction output, the gain of the GCA 16 is controlled.

That is, since the voltage $E_{other}$ is equal to 0 in the region where the color is detected to be the skin color, the subtraction output of the subtractor 21 is $-E_{skin}$. In case of the voltage, namely, $-E_{skin}$ of the region where the skin color is detected, the gain of the GCA 16 is set to 1. Thus, the color gain of the skin color region is set to 1. On the other hand, since the voltage $E_{other}$ is generated in the region other than the skin color region, the subtraction output ($E_{other} - E_{skin}$) of the subtractor 21 rises. Therefore, the color gain in the GCA 16 rises in accordance with the value of the voltage $E_{other}$. As the skin color component is smaller, the subtraction output of the skin color region rises and the color gain increases. As mentioned above, the color gain in the region other than the region where the color is detected to be the skin color is raised.

In the above example, the control of the color gain in the GCA 16 has been performed on the basis of the subtraction output obtained by subtracting the skin color component $E_{skin}$ from the other color component $E_{other}$ by the subtractor 21. The invention, however, is not limited to such an example. For example, it is also possible to construct in a manner such that a divider is provided in place of the subtractor 21 and the color gain in the GCA 16 is controlled by a division output obtained by dividing the other color component $E_{other}$ by the skin color component $E_{skin}$. In such a case, even if the skin color component $E_{skin}$ is equal to 0 or a value near 0, it is desirable to limit the division output so that the division output effectively acts and to set a predetermined value to the maximum value.

Predetermined coefficients a and $\alpha$ and $\beta$ can be also multiplied to $E_{other1}$ and $E_{other2}$, respectively. That is, $$E_{other} = \alpha \times E_{other1} + \beta \times E_{other2}$$

The coefficients $\alpha$ and $\beta$ are set to proper values so as to raise the gain of a desired color in the GCA 16. For instance, coefficients p, q, and r are set into the three primary color signals and the coefficients of the color components corresponding to $E_{other1}$ and $E_{other2}$ are respectively set to $\alpha$ and $\beta$ so as to select a desired color. With this method, the color gain of the desired color can be raised to a value higher than the ordinary gain while keeping the gain of the skin color constant.

As colors having a special meaning mentally, there are, for example, an advance color and a backward color besides the foregoing skin color. In the case where those colors are arranged in the other colors, the advance color is seen as if it was emphasized ahead and the backward color is seen as if it sank. Therefore, by emphasizing the advance color and backward color, a stereoscopic feeling can be given to an image. As an advance color, red is a representative color. As a backward color, blue is a representative color.

Figure 5:
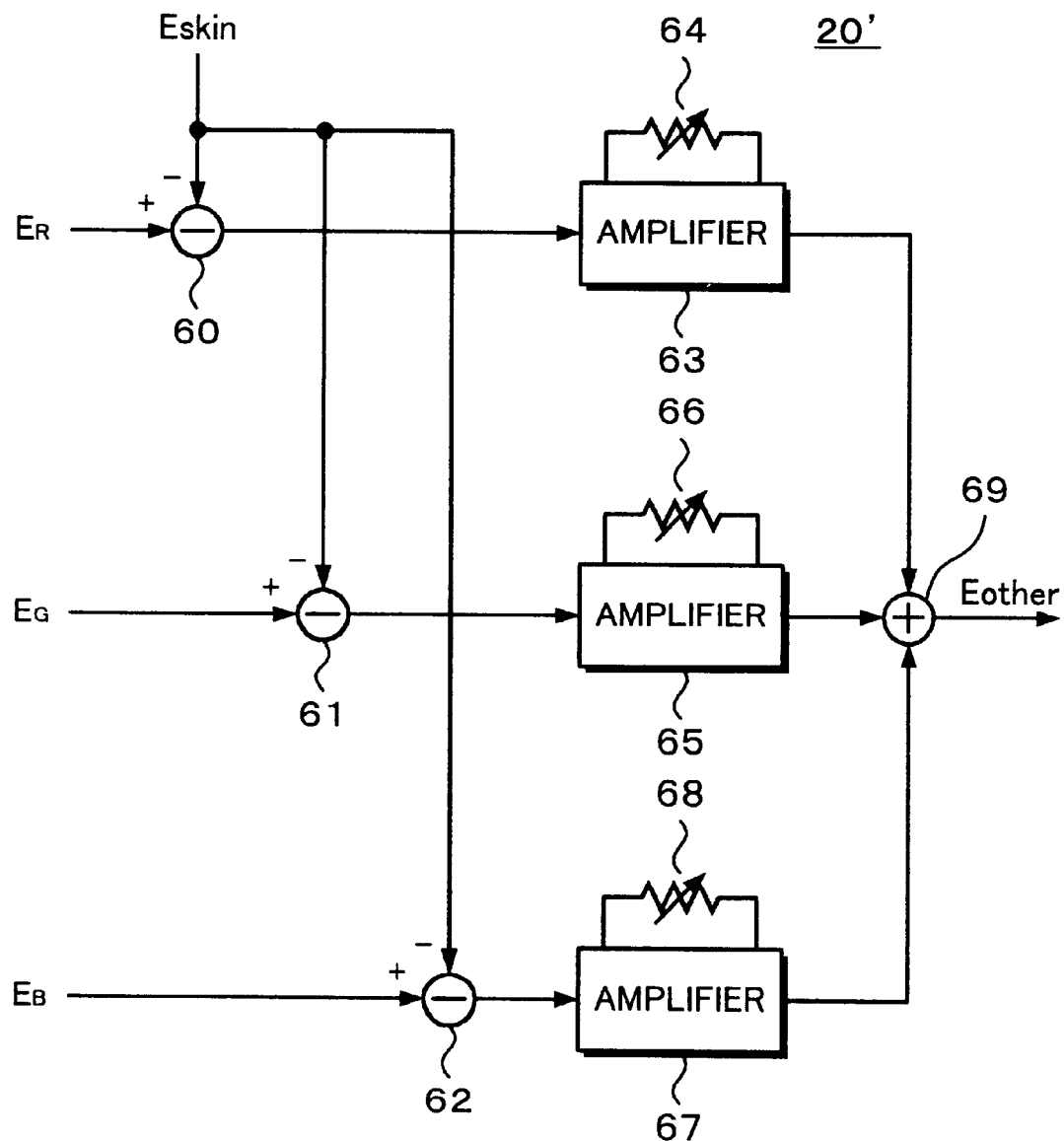
FIG. 5 is a diagram showing an example of a construction of a color component detecting circuit in case of emphasizing an advance color and a backward color.

By replacing the color component detecting circuit 20 shown in FIGS. 1A and 1B mentioned above to a construction of a circuit 20' shown as an example in FIG. 5, the advance color and the backward color can be emphasized. The voltages $E_R$, $E_G$, and $E_B$ of the colors which were supplied are converted into the voltages $E_R'$, $E_G'$, and $E_B'$ by the analog arithmetic operating unit (not shown), respectively. The voltages $E_R'$, $E_G'$, and $E_B'$ are supplied to one input terminal of each of subtractors 60, 61, and 62, respectively. The skin color component $E_{skin}$ obtained by the skin color detecting circuit 19 is supplied to the other input terminal of each of the subtractors 60, 61, and 62.

Differences $(E_R - E_{skin})$, $(E_G - E_{skin})$, and $(E_B - E_{skin})$ are obtained by the subtractors 60, 61, and 62, respectively. Those subtraction outputs are supplied to amplifiers 63, 65, and 67, respectively. The amplifiers 63, 65, and 67 have gain varying means 64, 66, and 68 comprising, for example, variable resistors, respectively. By setting the gain varying means 64, 66, and 68 to predetermined values, gains of the amplifiers 63, 65, and 67 can be set. Outputs of the amplifiers 63, 65, and 67 are respectively supplied to an adder 69 and are added. An addition output is outputted as a voltage $E_{other}$ and is supplied to the subtractor 21.

By raising the gains of the amplifiers 63 and 67 by the gain varying means 64 and 68, red and blue are emphasized and the advance color and the backward color are enhanced. That is, by increasing the components of $[E^{R'} - \min(E_R', E_G', E_B')]$ and $[E_B' - \min(E_R', E_G', E_B')]$, the voltage $E_{other}$ is obtained.

By using the circuit 20' shown in FIG. 5, the increase in color gain of the desired color mentioned above can be realized. By setting the gains of the amplifiers 63, 65, and 67 to 1, respectively, the emphasis of the color gain other than the skin color shown first can be realized.

The second embodiment of the invention will now be described with reference to the drawings. FIGS. 6A and 6B show an example in which the invention is applied to a video apparatus to which a stereoscopic video signal comprising a video signal 30L for the left eye and a video signal 30R for the right eye is inputted and is displayed on a screen 34 or the like, thereby obtaining a stereoscopic image. Reference characters L and R shown in the diagrams are used to express the corresponding relation between the left-eye video image and the right-eye video image. In FIGS. 6A and 6B, portions common to those in FIGS. 1A and 1B are designated by the same reference numerals and their detailed descriptions are omitted.

The video signal 30L for the left eye and video signal 30R for the right eye are the video signals obtained, for example, by photographing with an almost same angle of view as the angle of view of the human being by using two cameras. The video signals are not limited to the video signals obtained by photographing but video signals obtained by, for example, computer graphics can be also used. Since the processes in a range from Y/C separating circuits 14L and 14R to preamplifiers 22L and 22R for the left-eye video signal 30L and right-eye video signal 30R are substantially the same as those in the construction shown in FIGS. 1A and 1B mentioned above, their detailed descriptions are omitted.

The three primary color signals R, G, and B outputted from the preamplifiers 22L and 22R are supplied to projectors 31L and 31R, respectively. The projectors 31L and 31R have, for example, liquid crystal displays (LCDs) and LCD driving circuits, respectively, and display the supplied three primary color signals R, G, and B to the LCD via the LCD driving circuits and illuminate light from a light source to the LCD, thereby projecting a video image onto the screen 34.

In the apparatus to which the video signal for the left eye and the video signal for the right eye are respectively supplied and projected, for example, a horizontal filter 32 having a plane of polarization in the horizontal direction is inserted between the projector 31L and screen 34. Similarly, for instance, a vertical filter 33 having a plane of polarization in the vertical direction is inserted between the projector 31R and screen 34. Video images projected from the projectors 31L and 31R are synthesized on the screen 34.

When enjoying a stereoscopic image, the observer observes the screen 34 by using dedicated glasses 35 having a horizontal filter 36 and a vertical filter 37 for the left eye and the right eye, respectively. Thus, the video signal for the left eye and the video signal for the right eye which were projected from the projectors 31L and 31R are individually seen as separate images for the left and right eyes of the observer and he can enjoy a stereoscopic video image. The stereoscopic video image has properly been subjected to a color emphasis by the processes which are executed in skin color detecting circuits 19L and 19R, color component detecting circuits 20L and 20R, or the like, respectively.

Although the horizontal filter 32 and vertical filter 33 have been used between the projectors 31L and 31R and the screen and the horizontal filter 36 and vertical filter 37 have been used above for the glasses 35, the invention is not limited to such an example. For example, it is also possible to use right turn filters in place of the horizontal filters 32 and 36 and left turn filters in place of the vertical filters 33 and 37. In this case, a looking posture is changed and even if the observer lies on his side, the video signal for the left eye and the video signal for the right eye are separated and he can enjoy a stereoscopic video image.

The third embodiment of the invention will now be described with reference to the drawings. FIGS. 7A and 7B show an example of a construction of a video apparatus according to the third embodiment. In a manner similar to the foregoing second embodiment, the video apparatus also provides a stereoscopic video image to the observer by a stereoscopic video signal comprising a video signal for the left eye and a video signal for the right eye. According to the third embodiment, the left-eye video signal and the right-eye video signal are alternately inputted every field. In FIGS. 7A and 7B, portions common to those in FIGS. 1A and 1B mentioned above are designated by the same reference numerals and their detailed descriptions are omitted.

A stereoscopic video signal 50 in which the left-eye video signal and the right-eye video signal have been sequentially inserted every field is supplied to the Y/C separating circuit 14. The luminance signal Y separated by the Y/C separating circuit 14 and the color difference signals R-Y and B-Y separated by the Y/C separating circuit 14 and demodulated by the color demodulating circuit are supplied to a field double speed circuit 51. The field double speed circuit 51 forms a video signal of a double field frequency from the input video signal.

FIGS. 8A, 8B and 8C show a process by the field double speed circuit 51. In FIGS. 8A, 8B and 8C, the color difference signals are omitted for simplicity of explanation. When an input luminance signal Y (FIG. 8A) of a field period Tv (1/60 second in the NTSC system; 1/50 second in the CCIR system) is supplied, an output luminance signal (FIG.

8B) of a field period (½·Tv) is generated. That is, a field A1 of the double field frequency is formed from a field A (video signal for the left eye) of the input luminance signal. A field B1 of the double field frequency is formed from a field B (video signal for the right eye) of the input luminance signal. The field A1 is, for example, delayed and again appears as a field A2 after the field B1. Similarly, the field B1 is, for example, delayed and again appears as a field B2 after the field A2. That is, for example, the field A1 shown in FIG. 8B is started at a timing of the field B shown in FIG. 8A. FIG. 8C shows a pulse signal 2V whose level is inverted every double speed field. Such a double speed process can be performed by a construction in which the video signal is converted into the digital signal and is time base compressed by a digital memory.

According to the third embodiment, the pulse signal 2V synchronized with the double speed field uses the fields (A1, A2, . . . ) at the high level as a video signal for the left eye and uses the fields (B1, B2, . . . ) at the low level as a video signal for the right eye. A field double speed luminance signal 2Y is supplied from the field double speed circuit 51 to the matrix circuit 17 and matrix circuit 18, respectively. Similarly, field double speed color difference signals 2(R-Y) and 2(B-Y) are supplied to the matrix circuit 17 through the GCA 16 and are also supplied to the matrix circuit 18. In the matrix circuits 17 and 18, the supplied field double speed luminance signal 2Y and field double speed color difference signals 2(R-Y) and 2(B-Y) are converted into field double speed three primary color signals 2R, 2G, and 2B, respectively.

The field double speed three primary color signals 2R, 2G, and 2B outputted from the matrix circuit 17 are supplied to the CRT 23 through the preamplifier 22. The CRT 23 can display a color video signal of a field double speed. That is, a vertical scanning frequency and a horizonal scanning frequency of the CRT 23 is set to be twice as high as the frequency in case of displaying the video signal which is not a double speed.

In the skin color detecting circuit 19 and color component detecting circuit 20, $E_{skin}$ and $E_{other}$ are formed on the basis of the field double speed three primary color signals 2R, 2G, and 2B outputted from the matrix circuit 18, respectively. Those signals $E_{skin}$ and $E_{other}$ are supplied to one input terminal and another input terminal of the subtractor 21, respectively. A subtraction output by the subtractor 21 is supplied to the GCA 16. In the GCA 16, the gain control is performed on the basis of the subtraction output and the levels of the supplied field double speed color difference signals 2(R-Y) and 2(B-Y) signals are controlled. Thus, a video image in which the colors other than the skin color are emphasized is displayed on the CRT 23.

When the video image displayed on the CRT 23 is seen as a stereoscopic video image, the observer wears glasses 52 attached with shutters 53L and 53R on the left and right sides. As shutters 53L and 53R, shutters which can be electrically turned on and off, for example, liquid crystal shutters can be used. The shutters 53L and 53R are controlled so as to perform the on/off operations by the pulse signal synchronized with the pulse signal 2V.

For example, the pulse signal 2V is outputted from the field double speed circuit 51 and is supplied to, for example, an infrared transmitting circuit (not shown). The pulse signal 2V is infrared modulated by the infrared transmitting circuit and is transmitted. The transmitted infrared signal is received as a signal for synchronization of glasses to the glasses 52, which will be explained hereinlater. In the glasses 52, the shutter 53L is turned on and the shutter 53R is turned off for a period of time during which the pulse signal 2V is at the high level. The on/off states are inverted for a period of time during which the pulse signal 2V is at the low level. Thus, the left and right eyes can see the left-eye video image and the right-eye video image which are displayed by the CRT 23. Consequently, the observer can enjoy a stereoscopic video image. The stereoscopic video image has been properly color emphasized by the process which is executed in the skin color detecting circuit 19, color component detecting circuit 20, or the like.

The reason why the field double speed process is performed to the video signal by the field double speed circuit 51 is to remove a plane flicker which is caused when the shutters 53L and 53R are alternately turned on and off in the glasses 52. Therefore, the field double speed circuit 51 can be omitted. In this case, the same shall also similarly apply to the other processes.

Although the case of applying the invention to the apparatus constructed by the analog circuit has been described above, the invention is not limited to such an example. The invention can be also easily applied to an apparatus for digitally performing a signal process. In other words, for example, image data written in a field memory or a frame memory is extracted every pixel and the detection of the skin color component and the detection of the color components other than the skin color are executed to each of the extracted pixels, thereby obtaining the values corresponding to $E_{skin}$ and $E_{other}$, respectively. The values of R, G, and B in the pixel are controlled on the basis of the values obtained.

According to the invention as described above, the gain control for the colors other than the skin color components can be performed. Therefore, there is an effect such that the color contrast can be more naturally enhanced without a sense of physical disorder.

There is a contrast of the video image as one of factors at which the observer senses a stereoscopic feeling. However, according to the invention, since the contrast of the image can be emphasized without a sense of physical disorder, there is an effect that a video image which enables a stereoscopic feeling to be more easily perceived can be formed.

Further, at the time of the gain control for the colors other than the skin color component, by designating a specific color, there is an effect such that, for example, the gain of a desired color of the observer can be enhanced while keeping the gain of the skin color component held.

Similarly, by designating the advance color and backward color as specific colors, there is an effect that a video image in which a more stereoscopic feeling is emphasized can be displayed.

The present invention is not limited to the foregoing embodiments but many modifications and variations are possible within the spirit and scope of the appended claims of the invention.

What is claimed is:

1. A video image display apparatus for receiving a video signal and displaying a video image onto a display apparatus, comprising:
   first detecting means for detecting a skin color component of said video signal;
   second detecting means for detecting color components other than said skin color component of said video signal; and
   color component control means for controlling gains for the color components other than said skin color component of said video signal on the basis of a detection result of said first detecting means and a detection result of said second detecting means.

2. The apparatus according to claim 1, wherein said color component control means sets said gain to an ordinary gain, thereby not adjusting the display thereof, in the case where said video signal includes a skin color component, and sets said gain to a value larger than said ordinary gain, thereby adjusting the display thereof, in the case where said video signal includes a color component other than said skin color component.

3. The apparatus according to claim 1, further comprising means for selecting and setting a specific color, and
   wherein said color component control means sets said gain to an ordinary gain, thereby not adjusting the display thereof, in the case where said video signal includes a color component other than said skin color component.

4. The apparatus according to claim 1, further comprising:
   means for selecting and setting an advance color and a backward color, and wherein said color component control means sets said gain to an ordinary gain, thereby not adjusting the display thereof, in the case where said video signal includes a skin color component, and sets said gains of said advance color and said backward color to values larger than said ordinary gain, thereby adjusting the display thereof, in the case where said video signal includes a color component other than said skin color component.

5. A video image display apparatus, for receiving a video signal and displaying a video image onto a display apparatus, comprising:
   first detecting means for detecting a skin color component of said video signal;
   second detecting means for detecting color components other than said skin color component of said video signal;
   color component control means for controlling gains for the color components of said video signal on the basis of a detection result of said first detecting means and a detection result of said second detecting means; and
   matrix means for outputting three primary color signals on the basis of said video signal,
   said first detecting means comprising:
   means for normalizing each of said three primary color signals outputted from said matrix means by a predetermined ratio; and
   means for outputting a lowest signal level as said skin color component among said normalized three primary color signals.

6. A video image display apparatus for receiving a video signal and displaying a video image onto a display apparatus comprising:
   first detecting means for detecting a skin color component of said video signal;
   second detecting means for detecting color components other than said skin color component of said video signal;
   color component control means for controlling gains for the color components of said video signal on the basis of a detection result of said first detecting means and a detection result of said second detecting means; and
   matrix means for outputting three primary color signals on the basis of said video signal,
   said second detecting means comprising:
   means for normalizing each of said three primary color signals outputted from said matrix means by a predetermined ratio; and
   means for subtracting said skin color component detected by said first detecting means from each of said normalized three primary color signals.

7. The apparatus according to claim 1, wherein
   two systems each comprising said first detecting means, said second detecting means, and said color component control means are provided, and
   a video signal for a right eye and a video signal for a left eye are respectively processed.

8. The apparatus according to claim 1, wherein said first detecting means, said second detecting means, and said color component control means process a video signal for a right eye and a video signal for a left eye by time-divisional processes.

9. A video image display method of receiving a video signal and displaying a video image onto a display apparatus, comprising:
   a first detecting step of detecting a skin color component of said video signal;
   a second detecting step of detecting color components other than said skin color component of said video signal; and
   a color component control step of controlling gains for the color components other than said skin color component of said video signal on the basis of a detection result by said first detecting step and a detection result by said second detecting step.

10. The method according to claim 9, wherein in said color component control step, in the case where said video signal includes a skin color component, said gain is set to an ordinary gain, thereby not adjusting the display thereof, and in the case where said video signal includes a color component other than said skin color component, said gain is set to a value larger than said ordinary gain, thereby adjusting the display thereof.

11. The method according to claim 9, further comprising a step of selecting and setting a specific color,
   and wherein in said color component control step, in the case where said video signal includes a skin color component, said gain is set to an ordinary gain, thereby not adjusting the display thereof, and in the case where said video signal includes a color component other than said skin color component, said gain of said specific color is set to a value larger than said ordinary gain, thereby adjusting the display thereof.

12. The method according to claim 9, further comprising a step of selecting and setting an advance color and a backward color,
   and wherein in said color component control step, in the case where said video signal includes a skin color component, said gain is set to an ordinary gain, thereby not adjusting the display thereof, and in the case where said video signal includes a color component other than said skin color component, said gains of said advance color and said backward color are set to values larger than said ordinary gain, thereby adjusting the display thereof.

13. A video display image method for receiving a video signal and displaying a video image onto a display apparatus, comprising:
   a first detecting step of detecting a skin color component of said video signal;
   a second detecting step of detecting color components other than said skin color component of said video signal;
   a color component control step of controlling gains for the color components of said video signal on the basis of a detection result by said first detecting step and a detection result by said second detecting step; and a matrix step of outputting three primary color signals on the basis of said video signal, and wherein said first detecting step comprises:

a step of normalizing each of said three primary color signals outputted from said matrix step by a predetermined ratio; and a step of outputting a lowest signal level as said skin color component among said normalized three primary color signals.

14. A video display image method for receiving a video signal and displaying a video image onto a display apparatus, comprising:

a first detecting step of detecting a skin color component of said video signal;

a second detecting step of detecting color components other than said skin color component of said video signal;

a color component control step of controlling gains for the color components of said video signal on the basis of a detection result by said first detecting step and a detection result by said second detecting step; and a matrix step of outputting three primary color signals on the basis of said video signal, and wherein said second detecting step comprises:

a step of normalizing each of said three primary color signals outputted from said matrix step by a predetermined ratio; and a step of subtracting said skin color component detected by said first detecting step from each of said normalized three primary color signals.

15. The method according to claim 9, wherein two systems each comprising said first detecting step, said second detecting step, and said color component control step are provided, and a video signal for a right eye and a video signal for a left eye are respectively processed.

16. The method according to claim 9, wherein in said first detecting step, said second detecting step, and said color component control step, a video signal for a right eye and a video signal for a left eye are processed by time-divisional processes.

* * * * *